United States Patent
Chen et al.

(10) Patent No.: US 8,601,138 B2
(45) Date of Patent: Dec. 3, 2013

(54) METHOD FOR PROCESSING REQUEST FOR NETWORK ADDRESS/PORT TRANSLATION IN COMMUNICATION NETWORK

(75) Inventors: Yuepeng Chen, Shenzhen (CN); Fuqing Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 819 days.

(21) Appl. No.: 12/028,564

(22) Filed: Feb. 8, 2008

(65) Prior Publication Data

US 2008/0130653 A1 Jun. 5, 2008

Related U.S. Application Data

(63) Continuation of application No. PCT/CN2006/001725, filed on Jul. 17, 2006.

(30) Foreign Application Priority Data

Aug. 9, 2005 (CN) .......................... 2005 1 0091840

(51) Int. Cl.
*G06F 15/16* (2006.01)

(52) U.S. Cl.
USPC .......................................... 709/228; 709/225

(58) Field of Classification Search
USPC ........................................................ 709/228
See application file for complete search history.

(56) References Cited

U.S. PATENT DOCUMENTS

| | | | |
|---|---|---|---|
| 6,493,317 B1 | 12/2002 | Ma | |
| 6,661,806 B1 | 12/2003 | Eriksson et al. | |
| 6,735,169 B1 | 5/2004 | Albert et al. | |
| 2002/0065867 A1 | 5/2002 | Chauvel | |
| 2002/0155827 A1* | 10/2002 | Agrawal et al. | 455/414 |
| 2003/0233499 A1 | 12/2003 | Choi | |

(Continued)

FOREIGN PATENT DOCUMENTS

| | | |
|---|---|---|
| CN | 1467605 A | 1/2004 |
| CN | 100505685 C | 6/2009 |

(Continued)

OTHER PUBLICATIONS

RFC 3519 "Mobile IP Traversal of Network Address Translation (NAT) Devices" (Apr. 2003); H. Levkowetz and S. Vaarala.*

(Continued)

*Primary Examiner* — Phuoc Nguyen
*Assistant Examiner* — June Sison
(74) *Attorney, Agent, or Firm* — Leydig, Voit & Mayer, Ltd.

(57) ABSTRACT

A method for processing request for network address/port translation in a communication network includes: firstly, the first network entity transmits a network address/port request message which carries the priority information of the request; after receiving the request, the second network entity allocates the corresponding network address/port for the first network entity according to the priority information in the request message; finally, the second network entity returns the allocated network address/port information to the first network entity, and the allocated network address/port information is used for performing the network/address translation. By realizing the invention, the service having high priority, e.g. emergency service, can be processed for the network/address translation firstly to ensure the reliability of high priority service communication. Furthermore, it can provide distinguished process service of the network address/port translation during a network operation, and thereby enhancing the flexibility of the network operation.

5 Claims, 3 Drawing Sheets

(56) References Cited

U.S. PATENT DOCUMENTS

2004/0105452 A1* 6/2004 Koshino et al. ............... 370/401
2006/0168337 A1 7/2006 Stahl et al.
2008/0261554 A1* 10/2008 Keller et al. ............... 455/404.1

FOREIGN PATENT DOCUMENTS

| EP | 1372081 A2 | 12/2003 |
|---|---|---|
| EP | 1 429 566 A | 6/2004 |
| WO | WO 03/005217 A1 | 1/2003 |
| WO | WO 2004/023323 A1 | 3/2004 |

OTHER PUBLICATIONS

Frank Vahid, "The Softening of Hardware," Computer, vol. 36, No. 4, pp. 27-34, Apr. 2003, doi:10.1109/MC.2003.1193225.*

Steve McConnell, "Who Needs Software Engineering?," IEEE Software, vol. 18, No. 1, pp. 5-8, Jan./Feb. 2001, doi:10.1109/MS.2001.903148.*

Andrew Tanenbaum, Structured computer organization; (2nd ed.), Prentice-Hall, Inc., Upper Saddle River, NJ, 1984.*

Internet-Draft "Functional Requirements for Priority Services to Support Critical Communications" (Jun. 16, 2000) to Folts. ("Folts").*

RFC 3487 IEPREP SIP Requirements' (Feb. 2003) to Schulzrinne. ("Schulzrinne").*

State Intellectual Property Office of the People'S Republic of China, Written Opinion of the International Searching Authority in International Patent Application No. PCT/CN2006/001725 (Nov. 23, 2006).

European Patent Office, Examination Report in European Application No. 06761461.0 (Mar. 24, 2009).

Russian Patent and Trademark Agency (Rospatent), Examination Report in Russian Application No. 2008106314/09 (Aug. 24, 2009).

Russian Patent and Trademark Agency (Rospatent), Examination Report in Russian Application No. 2008106314/09 (Nov. 9, 2009).

Notice of Opposition in corresponding European Application No. 067614610 (Dec. 7, 2010).

* cited by examiner

METHOD FOR PROCESSING REQUEST FOR NETWORK ADDRESS/PORT TRANSLATION IN COMMUNICATION NETWORK

CROSS-REFERENCE TO RELATED APPLICATIONS

This application is a continuation of International Patent Application No. PCT/CN2006/001725, filed Jul. 17, 2006, which claims priority to Chinese Patent Application No. 200510091840.4, filed Aug. 9, 2005, both of which are hereby incorporated by reference.

FIELD OF THE INVENTION

The present invention relates to the network communication field and in particular to a method for processing a request for network address/port translation in a communication network.

BACKGROUND OF THE INVENTION

With the enlargement of the scale of the Internet, a variety of network services emerge rapidly, and various advanced multimedia systems emerge one after another, thus resulting in that multimedia services, such as highly sporadic FTP or HTTP containing image files, often need to be transmitted over Internet. Because the real time service in a network is sensitive to the characteristics such as the transmission delay and jittering in the network, the real time service is affected significantly when the FTP or HTTP services and the like are transmitted over the network. In addition, the transmission of multimedia services further occupies a large amount of network bandwidth, so that it is difficult to reliably transmit key services which need an assured bandwidth in the existing network.

In order to ensure the Quality of Service (QoS) of the real time services and the transmission of key services transmitted in the network, International Telecommunication Union (ITU) has proposed a function model required by an Internet Protocol (IP) signaling. As shown in FIG. 1, the function model mainly includes Session Control Functional Entity (SCFE), Bearer Control Functional Entity (BCFE), Switching Functional Entity (SFE), Connection Control Interface (CCI), Network Control Interface (NCI) and Switching Control Interface (SCI).

The functional effect of the functional entities in FIG. 1 is described below respectively.

(1) SCFE: A terminal user applies a service by interacting with an SCFE; SCFE is a general term of session functional entity (SeCFE) and service functional entity (SvCFE).

The SCFE initiates a QoS request. Parameters for a communication arrangement, such as the bandwidth, QoS and other parameter information, are usually determined by the SCFE. If a set of acceptable parameters can be agreed, the SCFE establishes, maintains and disconnects a network resource to provide an agreed arrangement, i.e. negotiated arrangement, by using a service provided by a BCFE.

(2) BCFE: It is responsible for establishing, modifying and releasing the network resource to provide an agreed arrangement.

The BCFE receives a service flow based QoS request from SCFE, and returns, after a path analysis, the path analysis result to SFE.

Depending on a selected QoS control mode, the BCFE needs to know some network topology information and resource status information, so as to analyze the QoS request and generate QoS arrangement data.

(3) SFE: It is used to cross connect a virtual connection established on a port with a virtual connection established on another port.

By using one or more such cross connections located on respective SFEs among users, a virtual connection among the users is eventually generated. The characteristic of the virtual connection is based on call parameters negotiated with an SFCE, while its route is determined by a BCFE. An SFE controlled by a BCFE generates or releases the cross connection according to the instruction received by an SCI interface.

(4) CCI: A CCI is an interface between the bearer control planes of a call/session layer and a transmission layer.

(5) NCI: An NCI is an interface between BCFEs, and belongs to an interface between networks (NNI).

(6) SCI: An SCI is an interface between the bearer control plane and transmission plane of the transmission layer.

In FIG. 1, an SFE further needs to support Network Address Port Translation (NAPT)/Network Address Translation (NAT) under the control of a BCFE. The flow of a corresponding NA(P)T process is as shown in FIG. 2, and includes the following steps.

Step 21: When there appears a condition triggering the NA(P)T process on an SCFE, a network address/port request message is sent to the BCFE.

Step 22: In response to receiving the network address/port request from the SCFE, the BCFE determines whether to perform a network address/port translation according to a local policy, to which SFE to send the network address/port request, and determines the network address range in the SFE.

Step 23: The BCFE sends a network address/port request to the SFE.

Step 24: In response to receiving the network address/port request from the BCFE, the SFE performs a network address/port allocation according to the information in the request.

Step 25: The SFE sends the allocated network address/port to the BCFE via the network/port request.

Step 26: The BCFE continues to send the network address/port allocated by the SFE to the SCFE by means of the corresponding response message for network address/port request.

Step 27: The SCFE establishes or updates a corresponding network address/port binding relationship so as to establish a media forwarding table.

It can be seen that all NA(P)T requests are processed equally in the above scheme, i.e. when NA(P)T resources are sufficient they can be allocated, and when NA(P)T resources are insufficient they can not be allocated. However, if emergency services are still treated equally without being given a priority, when NA(P)T resources are insufficient, the emergency services can not be processed in time, and thereby resulting in that the emergency services are interrupted due to insufficiency of NA(P)T resources, which will possibly cause life and property losses or serious accidents.

However, at present, no scheme for processing an NA(P)T request in a Resource and Admission Control Subsystem (RACS) can meet a special demand for the above emergency services.

SUMMARY OF THE INVENTION

The present invention provides a method for processing a network address/port translation request in a communication network, thus providing distinctively corresponding network address/port translation processing services with respect to different services in the communication network, so as to meet a special demand for emergency services for network address/port translation.

A method for processing a network address/port translation request in a communication network includes: receiving, by a second network entity, a network address/port request message containing priority information of the request from a first network entity; distinguishing a priority of the request according to the priority information on the request message, by the second network entity; and performing, based on the distinguished priority of the request, by the second network entity, a process with respect to the request.

It can be seen from the technical solutions provided by the present invention that the implementation of the present invention can make a service with a high priority, such as an emergency service, be processed with a network address/port conversion firstly so as to ensure reliability of the communication of the service with a high priority, and thus ensure the occurrence of life and property losses or serious accidents can be decreased effectively in a specific case.

Meanwhile, the present invention can further provide distinguished network address/port translation process services with regard to different services in an RACS network, so as to provide the distinguished services to users during a network operation, and effectively improve the flexibility of the network operation.

BRIEF DESCRIPTIONS OF THE DRAWINGS

DETAILED DESCRIPTIONS OF THE EMBODIMENTS

The core of the present invention is to propose an NA(P)T request mechanism for distinguishing a priority: the priority of a request is indicated in an NA(P)T request between network entities, and a corresponding network entities perform a process for distinguishing a priority according to the priority of the NA(P)T request.

Specifically, when a network address/port request is being sent, corresponding priority information is carried and afterwards, corresponding network address/port resource information is allocated to the request according to the corresponding priority information in an entity responsible for allocating the corresponding network address/port information. Therefore, the present invention can provide distinguished NA(P)T services to different services according to needs in a network, and thereby can meet a specific NA(P)T service demand in a specific case, such as an emergency service.

Figure 1:
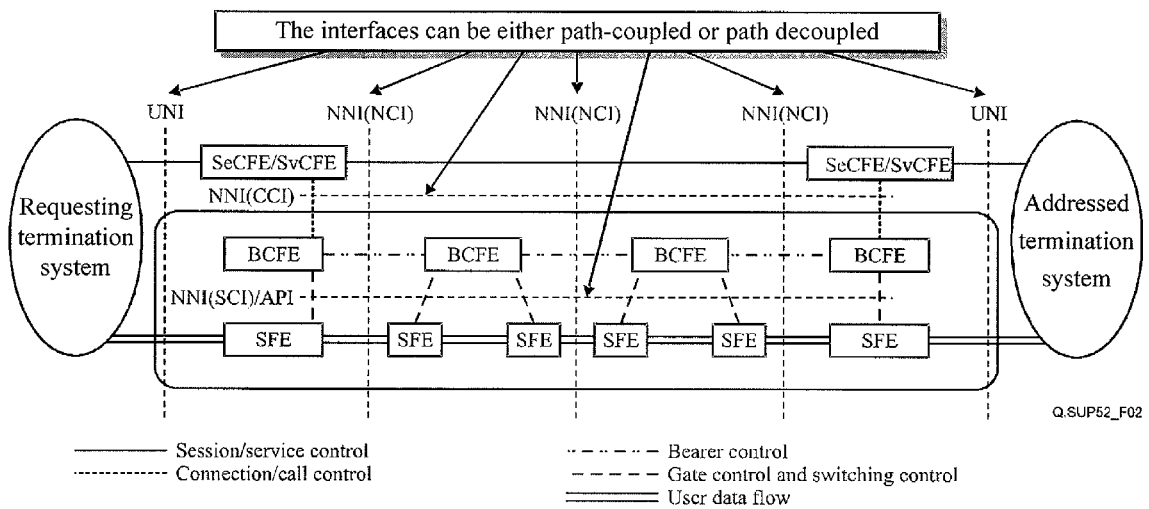
FIG. 1 is a schematic diagram of an IP-based signaling network model.
Figure 2:
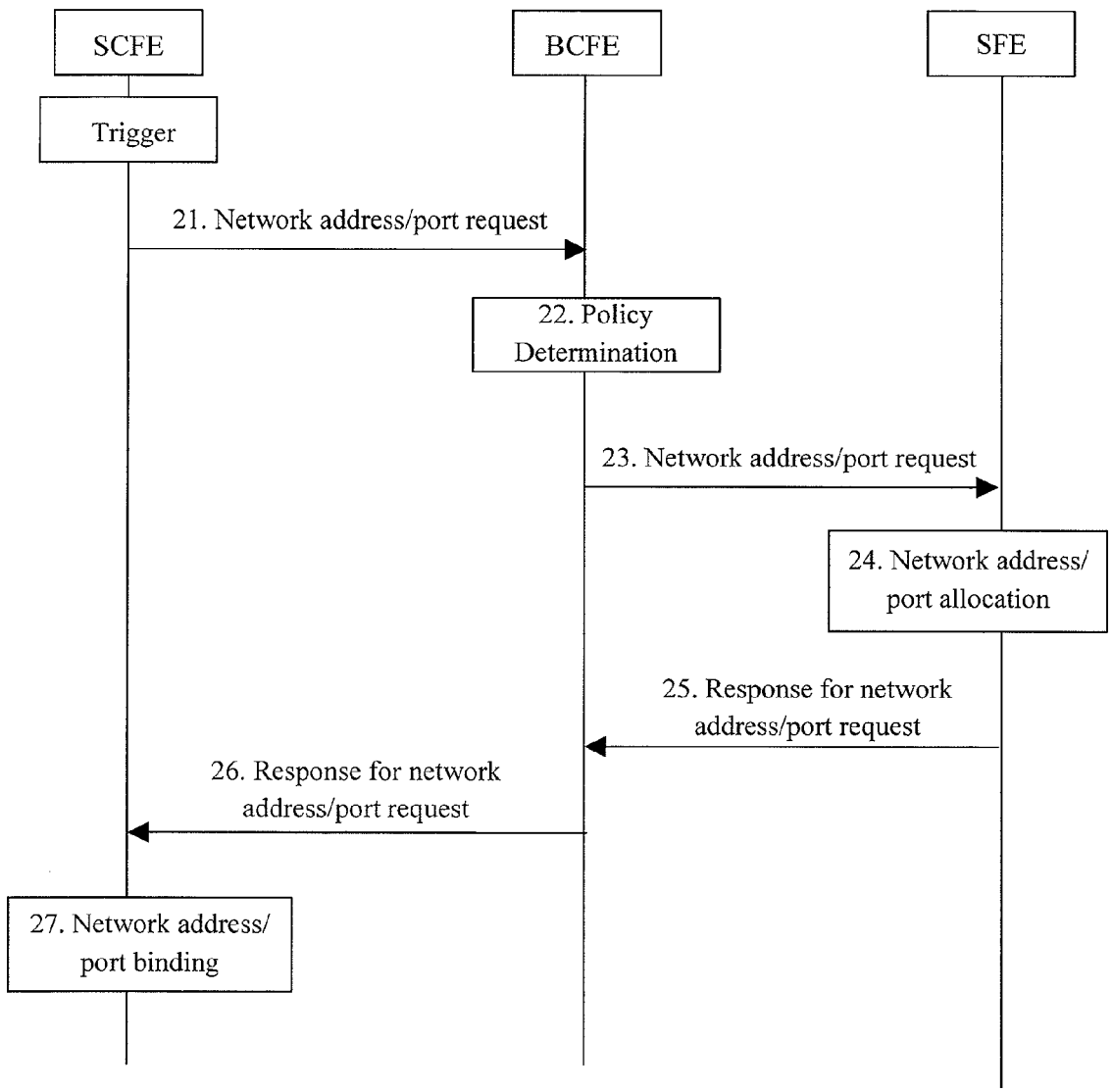
FIG. 2 is a schematic diagram of a procedure of an NA(P)T process in the prior art.
Figure 3:
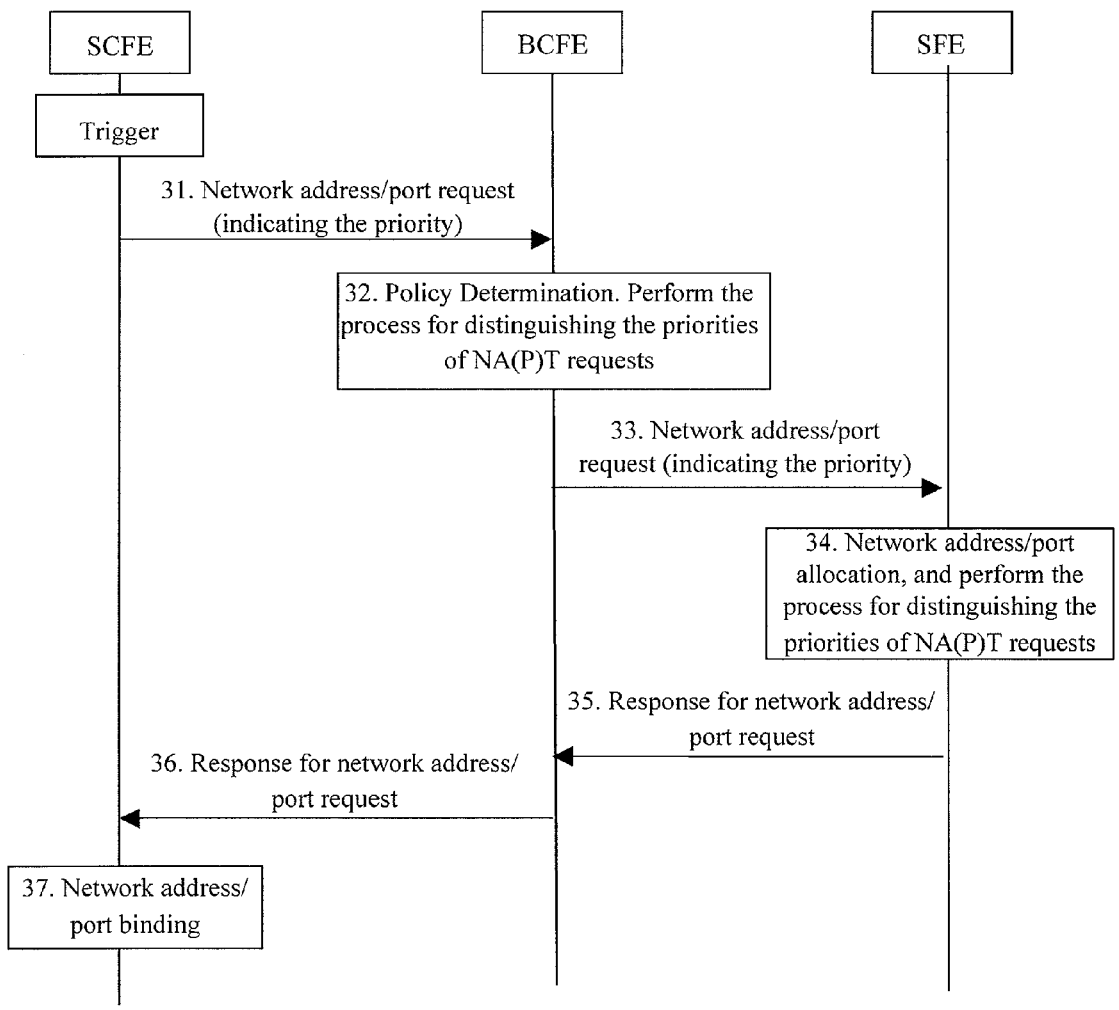
FIG. 3 is a schematic diagram of a procedure of an NA(P)T process according to an embodiment of the present invention.

An embodiment of the present invention is described as follows in detail in conjunction with the accompanying drawings. Although the present invention is described by taking a specific application as an example, it is not limited to the exemplary example. As shown in FIG. 3, an instance of the specific implementation of the method includes the following.

Step 31: When a triggering condition for sending an NA(P)T request occurs in the network, the SCFE sends to the BCFE a network address/port request message, in which corresponding priority information should be indicated.

The method for designating the priority of the NA(P)T includes, but is not limited to, the following two modes.

(1) Different NA(P)T request priorities use different message types. For example, when the priority of a request is high, a network address/port request is sent by using a corresponding request message with a high priority. Thus, the network entity receiving the request message can determine the priority information according to the type of the message.

(2) The priority information is carried in the NA(P)T request, i.e. values or identifications corresponding to various priority information are carried in a network address/port request message to be sent, and thus the network entity receiving the request message can determine corresponding priority information according to the values or identifications carried in the message.

In addition, a corresponding method for classifying priorities of NA(P)T requests includes, but not limited to, the following two modes.

(1) Priorities are divided into a plurality of levels, different values can be used to correspond to different priorities, or different priorities can be characterized by using other ways.

(2) Priorities are divided into high priorities and non-high priorities, i.e. requests are divided into common requests and high priority requests. For the high priority requests, a network address/port translation process to be performed preferably needs to be distinguished. For example, corresponding requests are divided into ones of emergency priorities and ones of non-emergency priorities.

Step 32: After the network address/port request message is received by the BCFE, a distinguishing process is performed on an NA(P)T request according to the priority of the request.

The distinguishing process method used by the BCFE includes, but not limited to, the followings.

(1) Determine whether to perform a network address/port translation: for an NA(P)T request with a high priority, the network address/port translation is performed firstly.

(2) Determine to which SFE to send the network address/port request: for an NA(P)T request having a high priority, an SFE with sufficient NA(P)T resources is selected firstly.

(3) Designate a network address domain of the NA(P)T source of the SFE, i.e. designating a network address domain complying with a predetermined criterion: for an NA(P)T request having a high priority, a better or larger network address domain is designated. The better address domain means that if there are a lot of allocatable addresses remaining in an address domain, it is a better address domain, or if an domain is reserved in advance for an emergency service, and it will not be allocated a common service in a general case, the address domain can also be regarded as a better address domain, or if the designation of an address domain can enhance the success rate of a network address/port request, the address domain can be regarded as a better address domain.

Step 33: The BCFE sends to the SFE a network address/port request message which still carries the corresponding priority information.

Step 34: The SFE performs a distinguishing process on the NA(P)T request according to the priority of the request, i.e. determines whether corresponding network address/port resource is allocated to the NA(P)T request according to the resource condition.

The distinguished process adopted by the SFE includes, but not limited to, the following modes.

(1) When an NA(P)T request with a high priority is processed, if the NA(P)T resource is insufficient, the SFE retracts the NA(P)T resource that has been allocated to an NA(P)T request with a low priority, and allocates the retracted NA(P)T resource to an NA(P)T request with a high priority.

(2) When an NA(P)T request with a low priority is processed, if the NA(P)T resource is insufficient, the SFE refuses to allocate the NA(P)T resource to the request, which can be specifically as follows. When an NA(P)T request with a low priority is processed, if the remaining NA(P)T resource is decreased to a predetermined value, the SFE refuses to allocate an NA(P)T resource to the request, so that the remaining NA(P)T resource is reserved for a subsequent NA(P)T request with a high priority.

After the SFE allocates a corresponding network address/port information to the NA(P)T request, or the SFE decides not to allocate a corresponding network address/port information to the NA(P)T request, the corresponding process which is the same as that in the prior art can be used.

After the SFE allocates a corresponding network address/port information to the NA(P)T request, the corresponding process is still as shown in FIG. 3, which is described as follows.

Step 35: The SFE sends the allocated network address/port to the BCFE by use of a respond message for the network address/port request.

Step 36: The BCFE continues to send a network address/port allocated by the SFE to the SCFE by use of the respond message for the corresponding the network address/port request.

Step 37: The SCFE establishes or updates a corresponding network address/port binding relationship to establish a media forwarding table.

In summary, according to the present invention, a service with a high priority, especially an emergency service, can be processed firstly on the SFE with an NA(P)T process, so as to ensure reliability of the communication of a service with a high priority, thereby reducing the occurrence of life and property losses or serious accidents in an emergency case.

The above is only an exemplary embodiment of the present invention, but the protection scope of the present invention is not limited to this. Any changes or substitution that can be easily conceived by a person skilled in the art within the disclosure of the present invention should fall into the protection scope of the present invention. Thus, the protection scope of the present invention is defined by the protection scope of the appended claims.

What is claimed is:

1. A method for processing a network address translation or network address port translation request in a communication network comprising:
   receiving, by a bearing control functional entity (BCFE), a first network address translation or network address port translation request containing priority information of the first network address translation or network address port translation request from a session or service control functional entity (SCFE);
   distinguishing a priority of the first network address translation or network address port translation request according to the priority information contained in the first network address translation or network address port translation request, by the BCFE;
   performing, based on the priority of the first network address translation or network address port translation request, by the BCFE, a process with respect to the first network address translation or network address port translation request;
   sending, by the BCFE, a second network address translation or network address port translation request containing the priority information to a switching functional entity (SFE); and
   allocating, by the SFE, based on the priority information, network address translation or network address port translation resources with respect to the second network address translation or network address port translation request;
   wherein the allocating, based on the priority information, network address translation or network address port translation resources by the SFE comprises:
   when the SFE receives the second network address translation or network address port translation request with a low priority and the remaining network address translation or network address port translation resources are lower than a predetermined value, refusing, by the SFE, to allocate a network address translation or network address port translation resource to the second network address translation or network address port translation request, so that the remaining network address translation or network address port translation resources are reserved for a subsequent network address translation or network address port translation request with a high priority; and
   when the SFE receives the second network address translation or network address port translation request with a high priority and the resources are insufficient, by the SFE, retracting the network address translation or network address port translation resource that has been allocated to the second network address translation or network address port translation request with a low priority and allocating a corresponding network address translation or network address port translation resource to the second network address translation or network address port translation request with a high priority.

2. The method of claim 1, wherein distinguishing the priority of the first network address translation or network address port translation request comprises distinguishing the priority of the first network address translation or network address port translation request according to the type of the first network address translation or network address port translation request or according to a value or identification contained in the first network address translation or network address port translation request.

3. The method of claim 1, wherein distinguishing the priority of the first network address translation or network address port translation request comprises:
   distinguishing the priority of the first network address translation or network address port translation request into a high priority and a common priority according to the priority information contained in the first network address translation or network address port translation request; or
   distinguishing the priority of the first network address translation or network address port translation request into a plurality of different priorities according to the priority information contained in the first network address translation or network address port translation request which are represented by different values or identifications.

4. The method of claim 1, wherein the process with respect to the first network address translation or network address port translation request performed by the BCFE comprises at least one of the following:

performing a network address translation or network address port translation process on the first network address translation or network address port translation request, selecting a SFE of a network address translation or network address port translation resource for the first network address translation or network address port translation request, and designating a network address domain complying with a predetermined criterion for the first network address translation or network address port translation request.

5. The method of claim 1, further comprising:

sending, by the SFE, a network address or network address port to the BCFE by use of a respond message for the second network address translation or network address port translation request;

sending, by the BCFE, the network address or network address port allocated by the SFE to the SCFE by use of the respond message for second network address translation or network address port translation request;

establishing or updating, by the SCFE, a corresponding network address or network address port binding relationship to establish a media forwarding table.

* * * * *